United States Patent [19]

Piber

[11] 3,941,965

[45] Mar. 2, 1976

[54] SNAP-IN BUSHING AND FRAME DEVICES FOR MOUNTING IN A HOLE IN A PANEL

[75] Inventor: Earl T. Piber, Oconomowoc, Wis.

[73] Assignee: Cutler-Hammer, Inc., Milwaukee, Wis.

[22] Filed: Aug. 26, 1974

[21] Appl. No.: 500,362

[52] U.S. Cl. ............... 200/296; 200/295; 248/27 A
[51] Int. Cl.² ....................... H01H 9/02; G12B 9/10
[58] Field of Search ............. 200/295, 296; 248/27; 339/128, 129

[56] References Cited
UNITED STATES PATENTS

| | | | |
|---|---|---|---|
| 2,497,456 | 2/1950 | Johnson | 248/27 X |
| 2,632,615 | 3/1953 | Churchill | 248/27 |
| 2,860,233 | 11/1958 | Johnson, Jr. | 240/7.1 R |
| 2,891,103 | 6/1959 | Swengel | 339/128 X |
| 3,065,035 | 11/1962 | Biesecker | 339/128 |
| 3,168,612 | 2/1965 | Sorenson | 248/27 X |
| 3,354,302 | 11/1967 | Greasley | 248/27 X |
| 3,415,549 | 12/1968 | Chatham | 339/128 X |
| 3,453,408 | 7/1969 | Mune | 200/295 |
| 3,543,219 | 11/1970 | Pautrie | 339/128 X |
| 3,800,113 | 3/1974 | Sheahan | 200/295 |

FOREIGN PATENTS OR APPLICATIONS

| 802,439 | 12/1968 | Canada | 339/128 |
|---|---|---|---|

*Primary Examiner*—Robert K. Schaefer
*Assistant Examiner*—William J. Smith
*Attorney, Agent, or Firm*—H. R. Rather; Wm. A. Autio

[57] ABSTRACT

A round plastic bushing and frame for an electric switch wherein the bushing has a flared collar that is radially squeezed when it is pressed through a round hole from the back of a mounting panel and spreads out in front so that its edge locks the bushing to the panel for great strength retention. A pair of integral spring fingers press against the back of the panel to keep the collar tight against the front of the panel. The integral frame has a pair of parallel arms that hug the switch base and are terminated in hooks that engage notches on opposite sides thereof to secure the integral bushing and frame to the base.

In a first version where the bushing and frame cannot be molded integrally into final form, the collar is molded as a radial flange on the projecting end of the bushing and, after removal from the mold, is formed into a frusto-conical collar around the tip of the bushing for snap-in mounting.

In a second version, the retainer end of the bushing having the snap-in collar thereon is molded separately from the frame and remainder of the bushing, and the two parts are ultrasonically welded together.

In a third version, the retainer part of the bushing is molded as a separate snap-in tubular liner that is snap-inserted into the lower part of the bushing that is molded integrally with the frame.

In a fourth version, the retainer part of the bushing is molded as a separate snap-in tubular liner and its lower end is then inserted into and flared to grip the lower end of the remainder of the bushing that is molded integrally with the frame.

14 Claims, 15 Drawing Figures

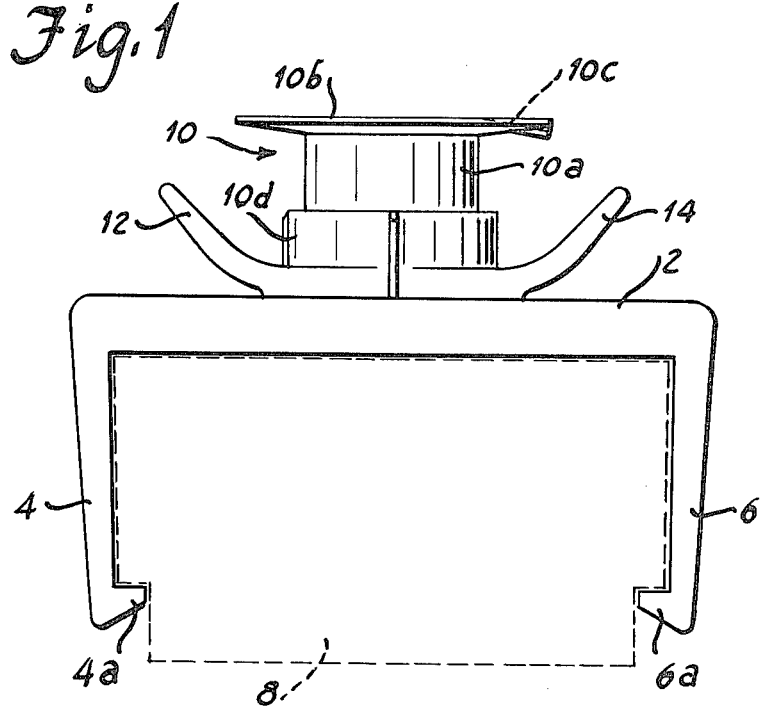
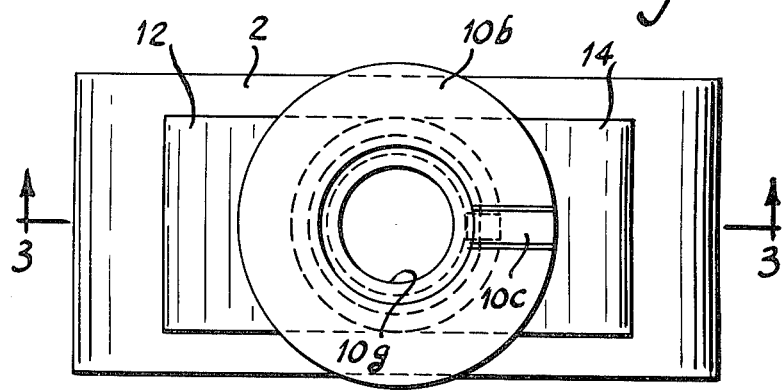
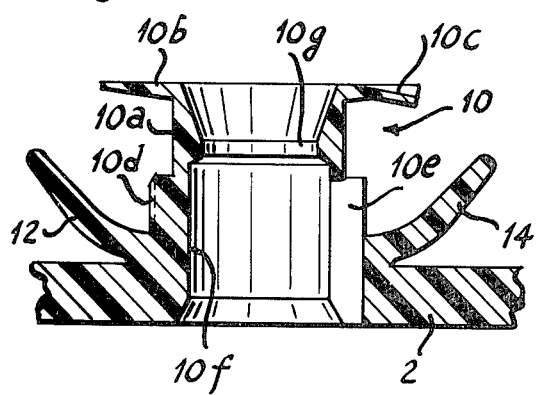
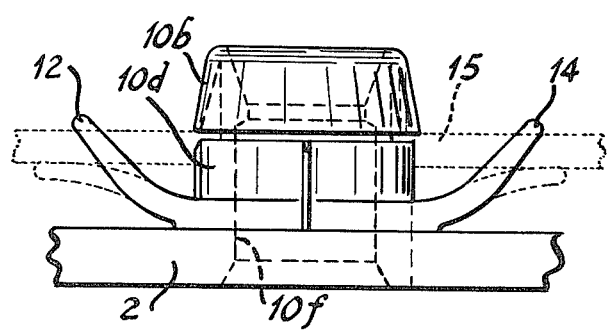

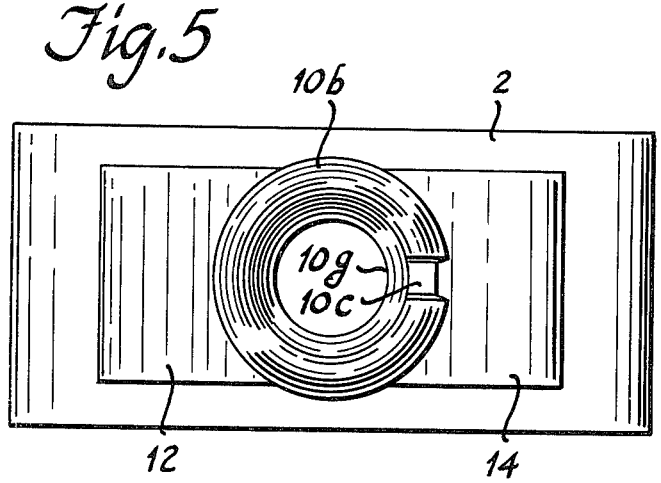
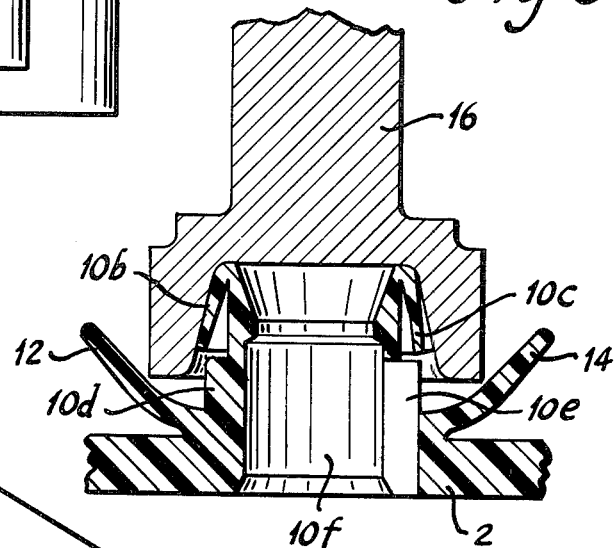
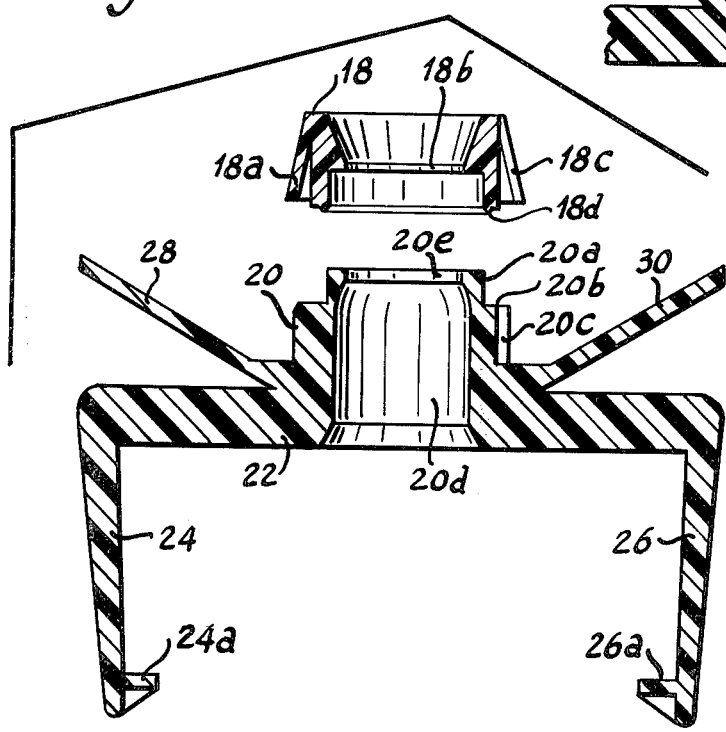
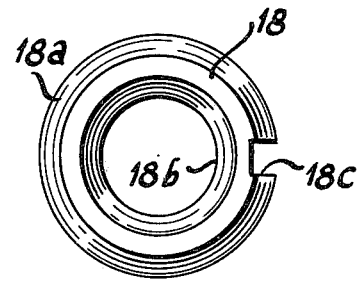
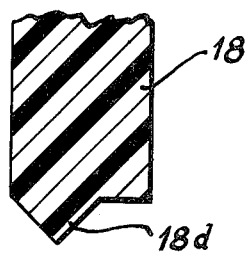

3,941,965

SNAP-IN BUSHING AND FRAME DEVICES FOR MOUNTING IN A HOLE IN A PANEL

BACKGROUND OF THE INVENTION

Snap-in devices for mounting switches and other electrical components have been known heretofore. Such prior structures, especially for rectangular apertures, customarily used biased fingers or the like that would grip the edges of the aperture in the mounting panel when the electrical device was pressed thereinto. However, these prior devices have not generally been suitable for snap-in mounting the round bushing of a toggle switch with sufficient strength of retention as well as completely closing the hole in the mounting panel and providing a smooth and neat appearance. While such prior snap-in mounting means have been useful for their intended purpose, this invention relates to improvements thereover.

SUMMARY OF THE INVENTION

This invention relates to snap-in bushing and frame devices for mounting in a hole in a mounting panel and more particularly to such bushing and frame devices of the stiff plastic type.

An object of the invention is to provide an improved method of and means affording a snap-in bushing and frame device having great strength of retention.

A more specific object of the invention is to provide an improved molded bushing and frame for an electrical device that may be pressed into a round hole from the back of a mounting panel and presents a smooth and neat appearance at the front of the panel.

Another specific object of the invention is to provide an improved snap-in bushing and frame that may be molded in one piece and then formed to provide a snap-in collar at the tip of the bushing.

Another specific object of the invention is to provide an improved snap-in bushing and frame that may be molded in two pieces and then joined to provide an integral snap-in structure.

Other objects and advantages of the invention will hereinafter appear.

BRIEF DESCRIPTION OF THE DRAWINGS

FIG. 1 is an enlarged front elevational view of a one-piece snap-in bushing and frame for an electric switch after the molding operation but before the forming operation and showing the switch base in broken lines;

FIG. 2 is a top view of the snap-in bushing and frame of FIG. 1;

FIG. 3 is a partial cross-sectional view taken along line 3—3 of FIG. 2;

FIG. 4 is a partial front elevational view of the snap-in bushing and frame of FIGS. 1-3 after the forming operation and showing the mounting panel in broken lines;

FIG. 5 is a top view of the formed snap-in bushing and frame of FIG. 4; and

FIG. 6 is a partial cross-sectional view of the formed snap-in bushing and frame of FIG. 4 along with an ultrasonic forming horn showing how the snap-in collar is formed;

FIG. 7 is an exploded enlarged cross-sectional view of a modification of the invention wherein the retainer is molded separately from the lower part of the bushing and frame and then welded thereto;

FIG. 8 is a top view of the retainer of FIG. 7;

FIG. 9 is a magnified fragmentary cross-sectional view of the lower edge of the retainer of FIGS. 7 and 8 showing the "energy director" formed thereon that is ultrasonically welded to the lower part of the bushing.

DESCRIPTION OF THE PREFERRED EMBODIMENTS

Figure 10:
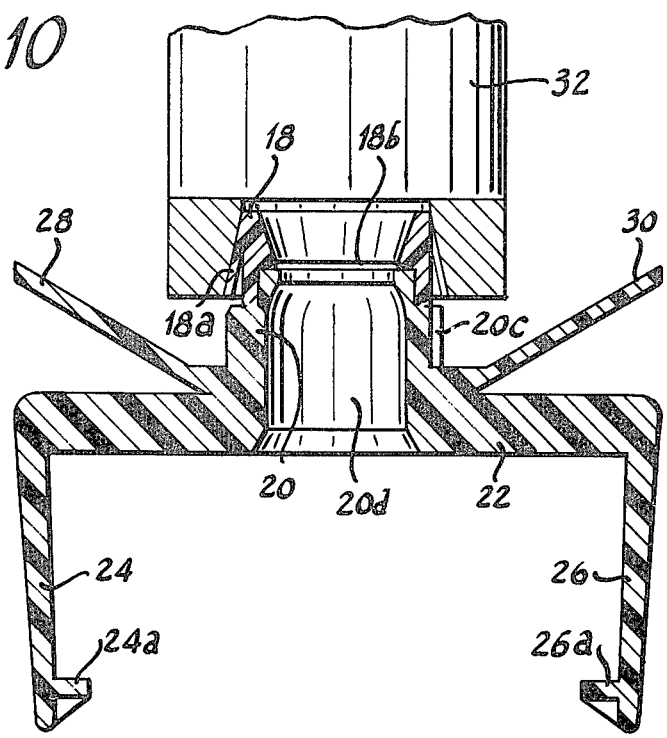
FIG. 10 is a cross-sectional view of the snap-in bushing and frame of FIGS. 7-9 showing the retainer secured to the lower part of the bushing and including the ultrasonic vibratory horn whereby the parts are secured together.

Referring to FIGS. 1-6, there is shown a first version of a snap-in bushing and frame device for a toggle switch. While only the bushing and frame part is shown in detail, toggle switches generally are well known in the art such as, for example, the toggle switch shown in R. G. Miller U.S. Pat. No. 3,146,330, dated Aug. 25, 1964, so that it will readily be apparent what purpose the snap-in bushing and frame device fulfills.

As shown in FIGS. 1 and 2, frame 2 is generally rectangular in top view and has a pair of depending legs 4 and 6, one at each end, for hugging the insulating housing or base 8 of the switch shown in broken lines. Each such leg has an inwardly directed hook, 4a and 6a, at its lower end that snaps into a notch in the switch base to retain the frame securely thereon and to close the open top of the base. As will be apparent, the base encloses the switch contacts, and a toggle lever (shown in broken lines in FIG. 13) is pivoted at its enlarged spherical midportion within the bushing, and has an external handle whereby it is actuated and an internal end that extends down through the bushing into the switch base for actuating the contacts, generally as shown in the aforementioned Miller patent.

As shown in FIGS. 1 and 2, an integral bushing 10 rises from the center of the frame. A pair of integral "back-up" or "pressure" elements 12 and 14 having wing-like configurations extend laterally left and right at upwardly curved angles. These elements 12 and 14 have some resiliency so that they will "give" when the bushing is pressed into a hole in the mounting panel and serve to apply bias forces to the back of the panel to keep the snap-in collar, hereinafter described, tight against the front of the panel.

As shown in FIG. 1, bushing 10 is provided with a reduced-diameter portion 10a at its upper end providing clearance space for the snap-in collar and terminating in a thin flange 10b at its tip, this flange having a keyway 10c molded at one side as more clearly shown in FIGS. 2 and 3. The lower portion 10d of the bushing has a large enough diameter to completely fill the hole in the panel.

Since for strength and dimensional stability, this bushing and frame device is made of stiff or semi-rigid thermoplastic material such as General Electric "Lexan," or the like, it would not be possible to mold it in one piece in its final form. This is because a mold insert could not be removed from the clearance under the snap-in collar. For this reason, this device is molded in the flanged shape shown in FIGS. 1–3 and is thereafter formed to the shape shown in FIGS. 4–6, having the snap-in collar 10b, to complete its manufacture. The bushing is provided with the reduced section 10a to provide clearance for snap-in collar 10b to be squeezed when the bushing is inserted into a round hole in the mounting panel. The hole in the mounting panel is normally provided with a key or lug at one side thereof that fits into and passes through keyway 10c. As shown in FIG. 3, the keyway has a continuation 10e into the larger diameter portion 10d of bushing 10 to keep the switch from turning after it has been mounted in the hole in the mounting panel 15 as shown in FIG. 4.

The bushing is provided with a bore 10F as shown in FIG. 3 having a constriction 10g at its upper portion. The toggle lever (shown in broken lines in FIG. 13) is inserted into this bore from below and has an enlarged spherical portion that bears against this constriction to pivot the toggle lever in the bushing.

FIG. 6 shows how the snap-in collar is formed after the bushing-frame has been molded. As shown therein, an ultrasonic vibratory horn 16 having the required configuration for the final desired form of the snap-in collar is pressed over flange 10b and is sonically or ultrasonically driven to provide the snap-in collar 10b with the form shown in FIGS. 4–6.

Now when this completed bushing is pressed through a hole in its mounting panel, collar 10b is squeezed and back-up elements 12 and 14 are biased until snap-in collar 10b spreads out on the front of the panel to retain the switch on the panel with great strength. In this position, the hole in the panel closely surrounds and hugs the larger diameter part 10d of the bushing at its upper shoulder, and back-up elements 12 and 14 are biased as shown in broken lines in FIG. 4. The continuous form of the collar provides the great strength.

FIGS. 7–10 show a modified form of bushing and frame for a toggle switch. This version is molded in two parts which are then ultrasonically welded together to provide the completed device.

As shown in FIG. 7, upper part 18 of the bushing is molded separately from lower part 20 of the bushing and frame 22, the latter two being molded integrally in one piece. It must be molded in two pieces so that the mold can be removed from the clearance space between upper part 18 of the bushing and its collar 18a. This upper part of the bushing is provided with a bore having a constriction 18b like that in the first version described above. Also collar 18a is provided with a keyway 18c molded therein as shown in FIGS. 7 and 8. In addition, the lower edge is provided with an "energy director" in the form of an annular V-shaped ridge 18d shown enlarged in FIG. 9 to aid in ultrasonic welding as hereinafter described.

The lower part 20 of the bushing is provided with a reduced-diameter portion 20a around which the upper part 18 closely fits and affords a shoulder 20b against which the upper part of the bushing is welded. A keyway continuation 20c is provided in this part of the bushing that is in registration with the keyway in the upper part.

Frame 22 is generally rectangular in top view as in the first version described above and is provided likewise with a pair of depending legs 24 and 26, one at each end, for hugging the insulating switch base that fits therebetween. These legs have hooks 24a and 26a, respectively, at their lower ends that snap into suitable notches in the switch base to retain the frame securely thereon and close the open top of the base. A pair of integral "back-up" elements 28 and 30 extend laterally left and right at upward angles for purposes described in connection with the first version shown in FIGS. 1–6. The lower part of the bushing is provided with a bore 20d having a constriction 20e at its upper end that joins constriction 18b in the upper part of the bushing when the two parts are welded together.

The manner in which the parts are joined together is illustrated in FIG. 10. Upper part 18 of the bushing is placed on top of and telescoped onto and around lower part 20. A vibratory horn 32 is then pressed down on the upper part and is driven sonically or ultrasonically to weld the parts together. Energy director 18d (FIG. 9) aids in starting the welding process to secure the parts together. This energy director enhances the flow of the material throughout the area of the joint to bind the parts together.

Figure 11:
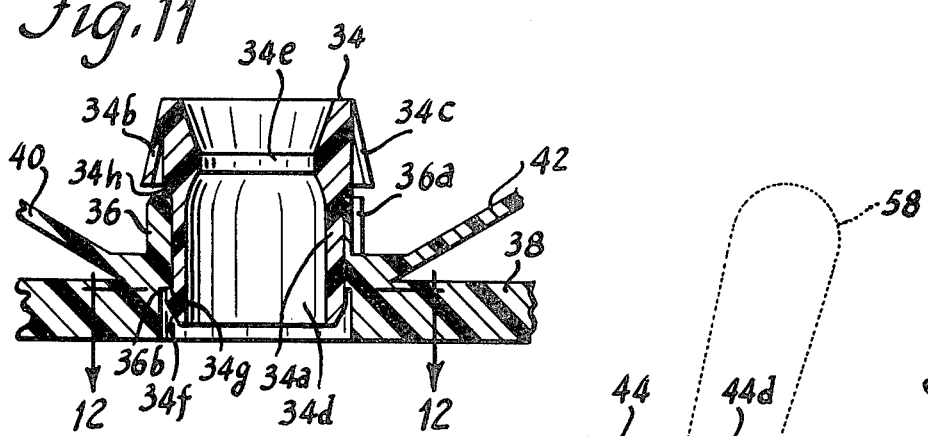
FIG. 11 is an enlarged partial cross-sectional view taken along line 11—11 of FIG. 12 of a second modification of the snap-in bushing and frame wherein the retainer is molded separately from the lower part of the bushing and is then snap-in connected thereto.

FIG. 11 shows a third version of the bushing and frame. In this version, upper part 34 of the bushing is molded as a separate piece and includes a substantially full-length liner 34a that is then snap-in assembled into the lower part 36 of the bushing. This lower part 36 of the bushing is molded integrally with frame 38. Frame 38 and its legs and hooks are similar to those in the versions hereinbefore described.

Upper part 34 of the bushing is provided with a snap-in collar 34b having an external keyway 34c molded therein. A bore 34d extends down through this upper part of the bushing and is provided with a constriction 34e affording a seat for the enlarged spherical portion of the toggle lever as hereinbefore described. An external keyway 36a extends along the lower part of the bushing in alignment with keyway 34c in the upper part of the bushing. Back-up elements 40 and 42 are similar to those in the previously described versions.

Upper part 34 of the bushing is provided with a bevel or chamfer 34f at its lower end to facilitate insertion thereof into the hole in the lower part of the bushing. Directly above this chamfer, the liner is provided with an annular ridge having a shoulder 34g that forms the snap-in hook for retaining the upper part of the bushing within the lower part of the bushing. The lower part of the bushing is provided with a stepped hole providing a complementary annular shoulder 36b onto which shoulder 34g of the liner catches when the latter has been pressed down all the way such that its upper annular shoulder 34h abuts the top edge of the lower part of the bushing. The material from which this bushing is molded has sufficient resiliency that it will squeeze down through the hole in the lower part of the bushing.

Figure 12:
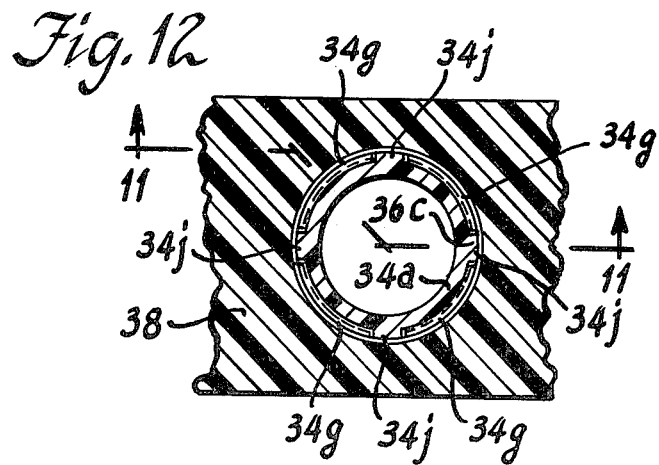
FIG. 12 is a cross-sectional view taken along line 12—12 of FIG. 11.

As shown in FIG. 12, the liner 34a is provided with a plurality of the aforementioned snap-in hooks or shoulders 34g that engage a corresponding plurality of annular shoulders 36b, four in the version illustrated. Between these four shoulders 34g, the outer wall of the liner is provided with four vertical keys 34j that slide into four complementary keyways 36c equally spaced around the inner wall of lower part 36 of the bushing. These four keys and keyways prevent the liner from turning after assembly.

Figure 13:
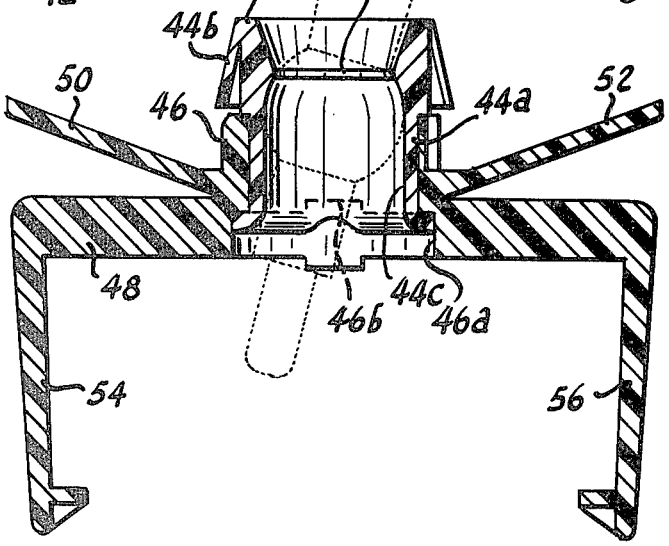
FIG. 13 is an enlarged cross-sectional view of a third modification of the snap-in bushing and frame wherein the retainer is molded separately from the lower part of the bushing and is then flared to grip the latter and showing the toggle lever in broken lines.
Figure 14:
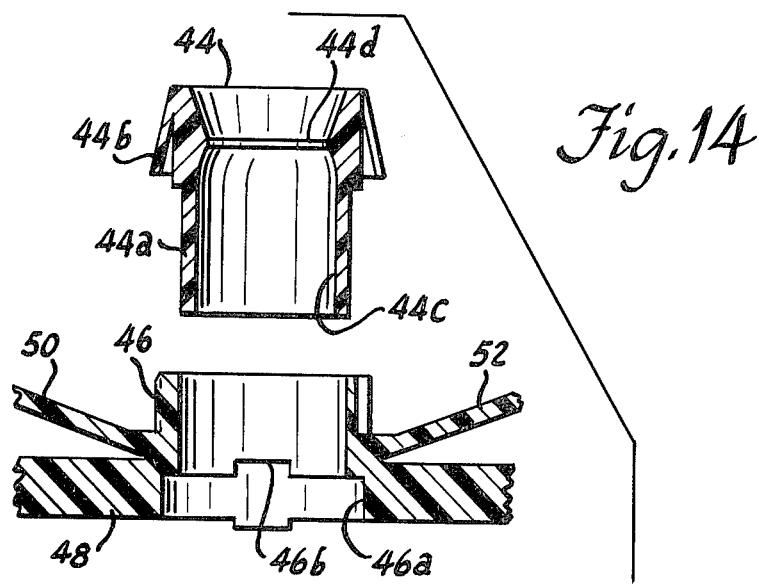
FIG. 14 is an exploded enlarged partial cross-sectional view of the snap-in bushing and frame of FIG. 13 showing how the retainer is molded before its lower end is flared in assembly.
Figure 15:
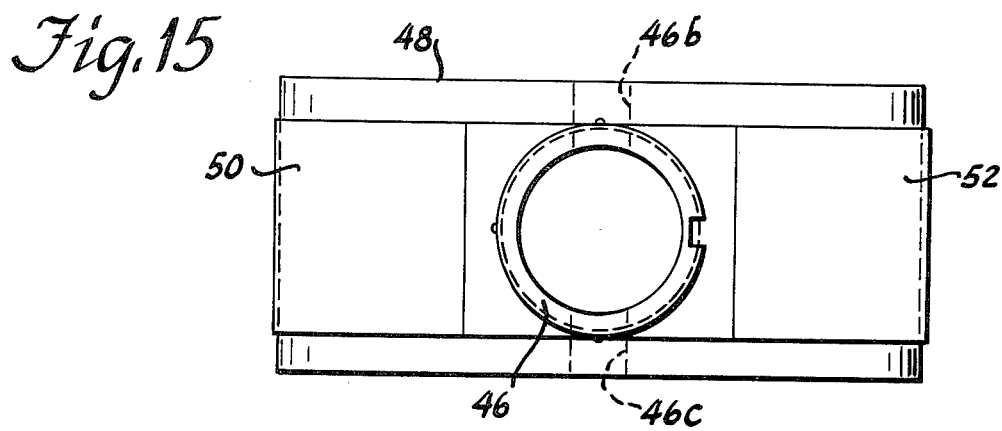
FIG. 15 is a top view of the snap-in bushing and frame of FIGS. 13 and 14.

FIGS. 13-15 show a fourth version of the snap-in bushing and frame. In this version, upper part 44 of the bushing is molded as a separate piece that includes a substantially full-length liner 44a that is then secured in the lower part 46 of the bushing that is integral with frame 48. This version differs from FIG. 11 in that the lower end of this liner is formed or flared rather than snapped-in to secure it in the hole in the lower part of the bushing. For this purpose, lower end 46a of the hole in the lower part of the bushing has a larger diameter than in FIG. 11 to provide more space for forming (flaring) the lower end of the liner thereinto. That is, the difference between the diameters of the two parts of the hole in the lower part of the bushing is greater in this version. As shown in FIGS. 13-15, a pair of notches 46b and 46c are provided in the shoulder between the two different diameters of the hole. The lower end of the liner is formed into these notches to keep it from turning after assembly as shown in FIG. 13. Back-up elements 50 and 52 are similar to those in the hereinbefore described versions for applying pressure to the back of the mounting panel so as to keep snap-in collar 44b tight against the front of the panel around the mounting hole in the latter. Legs 54 and 56 grip and retain the switch base as hereinbefore described in connection with FIG. 1. Bore 44c in the upper part of the bushing has a constriction 44d providing a pivotal seat for toggle lever 58 shown in broken lines in FIG. 13.

While the invention has been illustrated in connection with a round snap-in bushing, it will be apparent that other forms are possible so long as the retaining collar is substantially continuous around the periphery thereof. Also, other actuators than toggle levers are possible.

While the apparatus hereinbefore described is effectively adapted to fulfill the objects stated, it is to be understood that the invention is not intended to be confined to the particular preferred embodiments of snap-in switch bushing and frame devices for mounting in a hole in a panel disclosed, inasmuch as they are susceptible of various modifications without departing from the scope of the appended claims.

I claim:

1. A snap-in mounting means for an electric device adapting the device to be mounted from the rear through a hole in a mounting panel so that a part of the device is accessible at the front of the panel comprising:
   a bushing having a bore therethrough including means for retaining the accessible part of the electric device therein;
   a circular locking collar on said bushing flaring from the top thereof out toward the electric device to a point spaced from the device a distance greater than the thickness of the mounting panel;
   clearance space on the wall of said bushing beneath said locking collar allowing the latter to be squeezed thereinto when said bushing is pressed into the hole in the panel whereafter said locking collar will inherently flare out again to abut the front of the panel and lock the device to the panel;
   and the part of said bushing below said clearance space being large enough to be closely surrounded by the edge of the panel at the hole.

2. The snap-in mounting means defined in claim 1, wherein:
   said locking collar is frusto-conical in form;
   and said collar and bushing comprise a keyway for keying said snap-in mounting means to the panel.

3. A toggle switch adapted to be snap-in mounted in a hole in a mounting panel and having an insulating base housing the switch contacts and a pivotal toggle lever for actuating the switch contacts, and including the improvement comprising:
   a combined bushing and frame device having a frame portion and a bushing portion pivotally supporting the toggle lever on the base and closing the open top of said base and including:
   a peripheral snap-in collar on and integral with said bushing portion having sufficient resiliency to be squeezed through the hole in the mounting panel and effective to spread out so that its rim abuts the front surface of the panel around the hole therein:
   and resilient back-up members biased against the rear surface of the mounting panel to keep the snap-in collar tight against the front surface of the panel around the hole.

4. The toggle switch of claim 3, wherein said frame portion comprises a pair of depending legs for embracing the switch base and inwardly directed hooks on said legs for engaging notches on opposite sides of the switch base.

5. The toggle switch of claim 3, wherein said combined bushing and frame device comprises:
   a two-piece molded assembly including an upper bushing part integral with said snap-in collar and a lower bushing part integral with said frame portion;
   means affording telescoping of one of said bushing parts into the other bushing part;
   and means securing said bushing parts rigidly to one another.

6. The toggle switch of claim 5, wherein said securing means comprises:
   interfitting surfaces ultra-sonically welded together.

7. The toggle switch of claim 4, wherein said securing means comprises:
   a liner on said upper bushing part snap-in secured within said lower bushing part.

8. The toggle switch of claim 5, wherein said securing means comprises:
   a liner on said upper bushing part extending down through said lower bushing part and flared at its lower end to rigidly secure it therein.

9. The toggle switch of claim 3, wherein said combined bushing and frame device comprises:
   a two-piece plastic molded assembly including an upper bushing part integral with said snap-in collar and having a bore therethrough and a lower bushing part integral with said frame portion and having a bore therethrough;
   interfitting portions affording alignment of said upper and lower bushing parts so that said bores provide a toggle lever opening therethrough;
   means securing said bushing parts rigidly to one another;
   and a constriction in said opening forming a pivotal seat for an enlarged intermediate portion of the toggle lever.

10. The method of making a combined plastic bushing and frame for a toggle switch comprising:
  molding a one-piece bushing and frame wherein the frame has a cover for the switch base and a pair of legs for embracing the switch base and the bushing has a thin radial flange around the tip thereof;
  and forming said flange into a peripheral flared collar around the bushing so that it can be squeezed through the hole in the mounting panel and will spread whereby its rim will catch against the front surface of the panel.

11. The method of making a combined plastic bushing and frame for a toggle switch comprising:
  molding the bushing and frame in two pieces including:
  an upper bushing part having an integral peripheral snap-in collar therearound;
  a lower bushing part having integral therewith a frame for closing the top of the switch base, a pair of legs for embracing the switch base, and a pair of resilient back-up arms for pressing against the back surface of the mounting panel when the bushing is inserted through a hole therein to draw the snap-in collar against the front surface of the panel around the mounting hole;
  and securing said upper bushing part to said lower bushing part.

12. The method of claim 11, wherein said securing step comprises:
  ultrasonically welding said upper bushing part to said lower bushing part.

13. The method of claim 11, wherein said securing step comprises:
  inserting said upper bushing part into said lower bushing part;
  and snap-in attaching them together.

14. The method of claim 11, wherein said securing step comprises:
  inserting said upper bushing part into said lower bushing part;
  and flaring the inserted end of said upper bushing part to rigidly connect them together.

* * * * *